July 20, 1965  A. C. KRACKLAUER ETAL  3,195,729
UNITARY ROTATABLE PRESSURE LEAF FILTER
Filed March 3, 1961  3 Sheets-Sheet 1

INVENTORS:
Aloysius C. Kracklauer
Frank H. Passalaqua
By Merriam, Smith & Mandell
Attorneys.

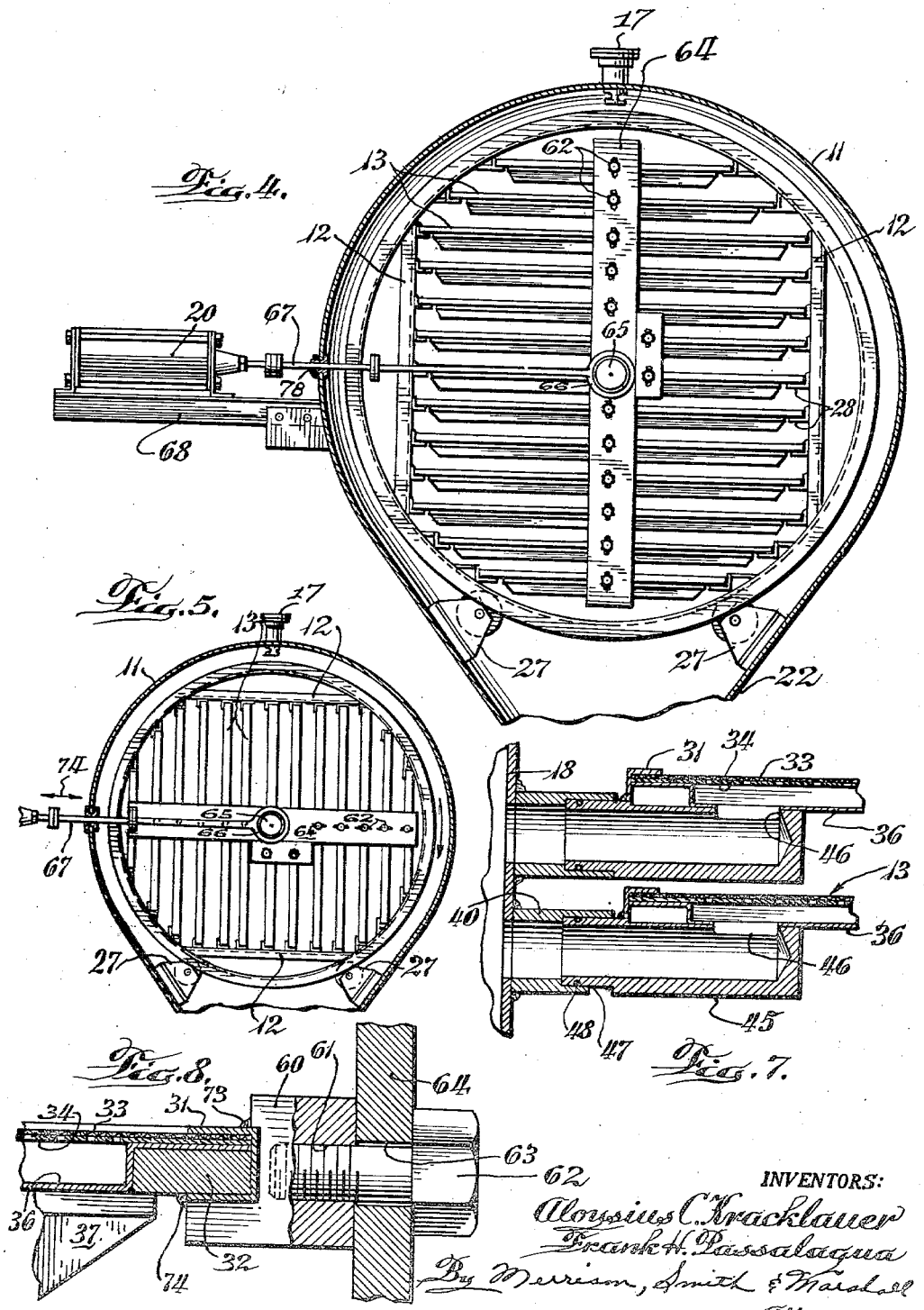

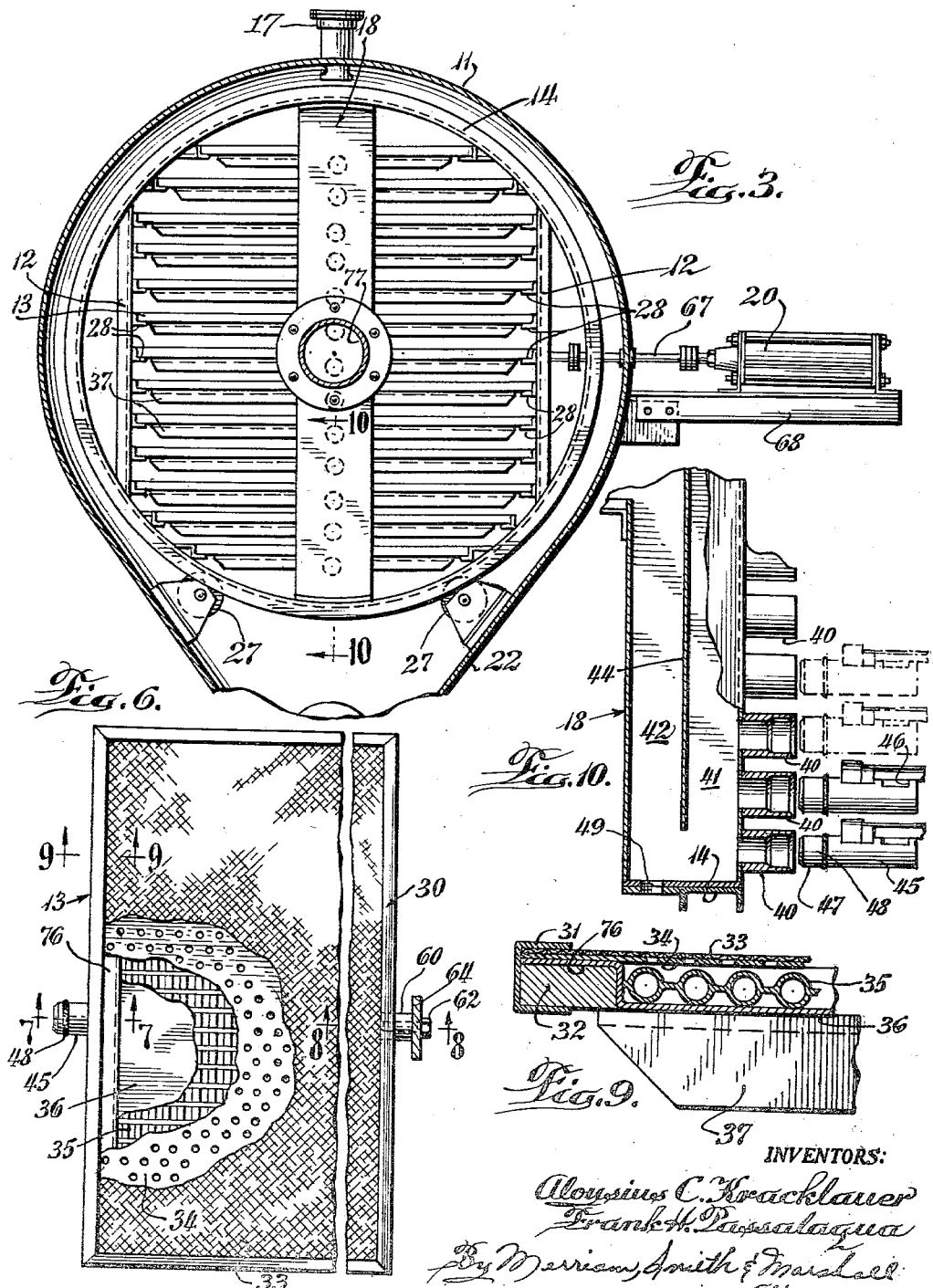

United States Patent Office 3,195,729
Patented July 20, 1965

3,195,729
UNITARY ROTATABLE PRESSURE LEAF
FILTER
Aloysius C. Kracklauer and Frank H. Passalaqua, Conroe, Tex., assignors, by mesne assignments, to C.I.T. Corporation, Houston, Tex., a corporation of New York
Filed Mar. 3, 1961, Ser. No. 93,234
10 Claims. (Cl. 210—330)

This application is a continuation-in-part of the present inventors' application Serial No. 792,110, filed February 9, 1959, and now abandoned.

This invention relates to pressure leaf filters and more particularly it pertains to pressure leaf filters in which the filter leaves are rotatable between horizontal and vertical positions.

The majority of pressure leaf filters heretofore used have been designed to be used with the filter leaves in a vertical position. Although this design permits filtration through both faces of each filter leaf it has led to certain difficulties particularly with respect to washing and drying the filter cake and in those applications where the operation of the filter is intermittent. In order to maintain the filter cake in position against the leaves in the usual vertical leaf pressure filter, there must always exist a pressure differential across the filter cake. If at any time during the filtration, drying, or washing operations this pressure differential is lost, pieces of the filter cake will fall to the bottom of the filter tank under the influence of gravity, thus exposing large areas on the filter leaves where no filter cake exists. If this occurs at the start of or during a washing or drying operation, the washing or drying fluid will preferentially pass through the exposed areas of the filter leaves and thus fail to accomplish the desired washing or drying of the entire cake. Furthermore, in those applications where the stream to be filtered flows only intermittently, the same breakdown in the filter cake is likely to appear during periods of no flow. Since the filter cake functions as the filter medium, the initial filtrate obtained after a temporary stoppage is likely to be muddy and therefore unacceptable until an unbroken filter cake is re-established.

A further difficulty encountered with vertical leaf pressure filters occurs during the drainage of the filter vessel prior to washing the cake. At the end of a filtering run the filter tank is full of residual unfiltered liquor which cannot easily be filtered, since any drop in the liquid level in the tank exposes a portion of the vertical filter leaves, so that the required filtering pressure cannot readily be maintained. It is preferred that the filter tank be substantially emptied of this residual unfiltered liquor in order to avoid enriching the wash liquid with the same, which thereby renders the washing operation inefficient. The residual liquor is therefore drained from the tank and either discarded or stored depending on its value. During the draining operation some positive gas pressure must be maintained in the tank in order to avoid breaks in the filter cake and the resulting difficulties described above. This operation requires a high degree of skill and close attention on the part of the operating personnel.

Certain horizontal leaf filters are known. These, however, require that the filter be disassembled and cleaned manually. This is a slow, tedious, and expensive operation which is unpleasant at best and which is further complicated when the wet cake is, for example, toxis or otherwise deleterious to the health of the operating personnel.

The above mentioned difficulties are eliminated by the pressure leaf filter assembly of the invention which provides a number of stacked horizontal filter leaves, each of which has a filtering surface on its uppermost surface only. Thus the accumulated filter cake is supported at all times so that cake stability is assured and the difficulties occasioned by breaks therein are eliminated. In order to facilitate removal of the filter cake from the filter, provision is made for rotating the filter leaves from a horizontal to a vertical position and for dislodging the cake therefrom so that it falls to the bottom of the filter tank or to a suitable receiving vessel.

The invention will be more clearly understood from the following detailed description thereof, taken in conjunction with the accompanying drawings, in which:

FIGURE 3 is a sectional view taken along line 3—3 in FIGURE 1;

FIGURE 4 is a sectional view taken along line 4—4 in FIGURE 1;

FIGURE 5 is a view similar to that of FIGURE 4, showing the filter elements in vertical position;

FIGURE 6 is a top view of a typical filter element used in the invention, with portions thereof broken away to show the inner construction;

FIGURE 7 is a sectional view taken along line 7—7 of FIGURE 6, showing in detail the manner of joining the filter elements to an internal manifold within the tank;

FIGURE 8 is a sectional view taken along line 8—8 of FIGURE 6, showing in detail the means used to attach the filter elements to a vibrator used to dislodge filter cake;

FIGURE 9 is a sectional view taken along line 9—9 in FIGURE 6; and

FIGURE 10 is a sectional view taken along line 10—10 of FIGURE 3 and showing a portion of the internal manifold with several filter elements in position to be inserted to form a seal with the manifold.

In the drawings, the same numbers are used to refer to like elements throughout the several views.

Figure 1:
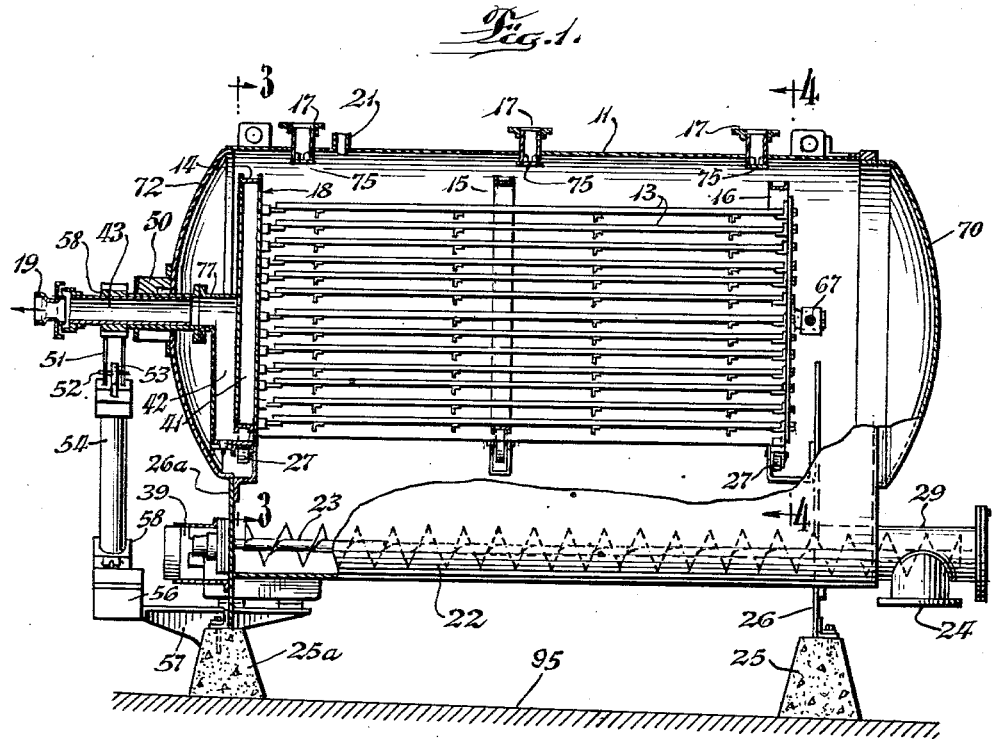
FIGURE 1 is an embodiment of the filter assembly of the invention with a portion of the tank wall cut away to show the arrangement of the filter leaves therein.

Referring initially to FIGURE 1, there is shown a typical embodiment of the subject invention comprising a cylindrical tank 11 containing a plurality of horizontally disposed, vertically stacked, spaced, parallel leaf-like filter units 13 each having an upper filtering surface and a lower non-filtering surface. The hollow interior of each filter unit 13 communicates with a filtrate-receiving manifold indicated generally at 18 and connected by conduits 43 and 19 to means outside tank 11 (and not shown) for lowering the pressure in the manifold and in the communicating filter units. Liquid to be filtered is introduced into tank 11 through inlets 17 (the air in said tank escaping through upper air vent 21) and the filtrate is sucked into the interior of filter units 13, through manifold 18, conduit 43 and finally outwardly through conduit 19. The remaining filter cake accumulates on the top surface of filter units 13.

It can be seen that in the manner described above substantially all of the liquid remaining in the filter tank at the end of a run can be filtered and thus be recovered. This is impossible with filters using vertical filter leaves, in which the end of a filtering run finds the filter full of unfiltered liquid which must be drained to waste or storage, except by the use of a horizontal "scavenger" plate placed at the bottom of the tank and usually curved to follow the contour of the vessel. Emptying the filter vessel by means of such a "scavenger" plate, however, is very time-consuming and in many cases more time is required for the scavenging operation than for the remainder of the filtration cycle.

Following filtration, the filter cake is sequentially washed and dried with a liquid and a drying gas, in that order, each introduced through inlets 17, said inlets having interior baffle plates 75 for distributing the inwardly directed fluids in a manner to avoid disturbing the filter cake accumulated on top of the filter units.

After the washing and drying, filter units 13 are rotated from the horizontal filtering position shown in FIGS. 1 and 4 to a vertical filter cake-dislodging position shown in FIGURE 5. In this position the filter units are vibrated by an external vibrator 20 (FIGS. 2 and 3), connected to the filter units by structure to be subsequently described in detail. Vibration of vertically disposed filter units 13 causes the accumulated filter cake to be dislodged from the units and to fall downwardly into a trough-shaped tank portion 22 containing a conveyor 23 (FIGURE 1) driven by a motor 39, said conveyor carrying the dislodged filter cake into a conduit 29 (to the right in FIGURE 1) wherein the conveyed filter cake is discharged through an outlet or spout 24, following which the filter units are rotated back to the horizontal filtering position and new liquid to be filtered is introduced through inlets 17.

Figure 2:
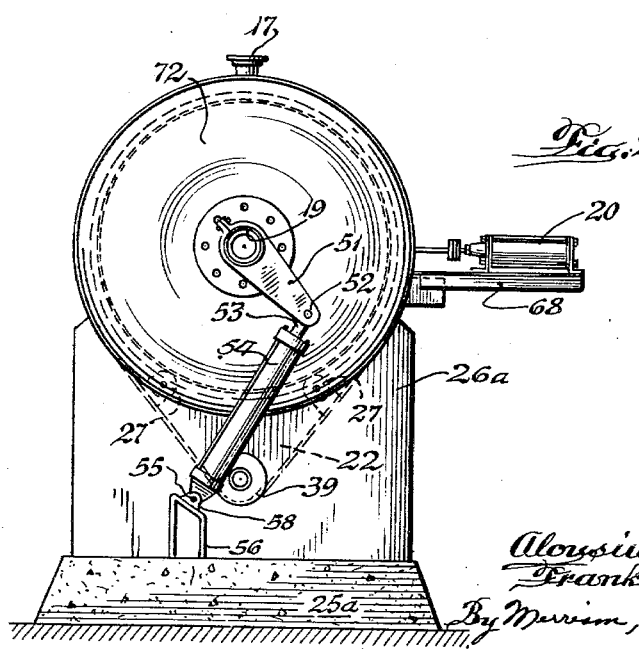
FIGURE 2 is an end view of the filter taken from the left in FIGURE 1.

Describing the entire filter assembly now in greater detail, reference is made to FIGS. 1 and 2, wherein there is shown a pair of base blocks 25 and 25a resting on a floor 95 and supporting respective tank-mounting frames 26 and 26a. Referring also to FIGS. 3 and 4, secured to the lower interior of tank 11 are a plurality of roller means 27 arranged in pairs, each pair rotatably supporting a respective ring 14, 15 and 16, said rings being axially aligned and encircling the filter units 13. Ring 14, encircling manifold 18, and ring 16, encircling units 13 at an end opposite manifold 18, have an outwardly facing U-shaped cross section for receiving rollers 27. Extending within each ring and fixed thereto are a pair of frame members 12. Frame members 12 and rings 14, 15 and 16 each mount a plurality of angle iron brackets 28, opposite pairs of which support a respective filter unit 13. As previously indicated ring 14 extends around manifold 18, the opposite ends of which are fastened to ring 14. Manifold 18 is connected to rotatable conduit portion 43 located outside tank 11 adjacent tank end 72. Rotation of conduit portion 43 by means to be subsequently described causes rotation of manifold 18, filter units 13, and rings 14, 15, and 16, all being rotatably supported by roller means 27.

A filter unit 13 is illustrated in detail in FIGS. 6 and 9. The unit has a substantially rectangular peripheral frame indicated generally at 13 and comprising a channel-shaped member 31 fastened to a bar 32. Extending across the frame 30 is an upper porous layer 33 (e.g., wire mesh) overlying a perforate plate 34, layer 33 and plate 34 defining the filtering surface of filter unit 13, while the lower non-filtering surface of the filter unit is defined by an imperforate plate 36. Plate 36 has an offset portion 76 which together with the edge portions of layer 33 and perforate plate 34 is sandwiched between bar 32 and a flange of channel 31. Extending between the filtering and non-filtering surfaces of the filter units and within the hollow interior thereof is means 35 for maintaining these surfaces in spaced relation when the pressure within the filter unit is decreased. Underlying the perforate non-filtering surface 36 are angle-shaped braces 37 each extending transversely between opposite frame bars 32.

Referring to FIGS. 7 and 10, lower surface 36 of filter unit 13 has an opening 46 adjacent manifold 18. Opening 46 communicates with a nipple 45 having a partially tapered end portion 47 received within a flared socket or connector 40 protruding from manifold 18. Nipple end 47 fits loosely within socket 40, but has an O-shaped sealing ring 48 which provides the necessary fluid-tight connection.

Filtrate passes from the interior of filter unit 13 through nipple 45, socket 40, into a first interior portion 41 of manifold 18, and then into a second manifold interior portion 42, the two manifold interior portions being separated by an internal wall or baffle 44. As shown in FIGURE 1, filtrate from interior portion 42 is sucked through a manifold conduit portion 77, through an intermediate rotatable external conduit portion 43 secured to portion 77, and finally into the outlet conduit 19.

As previously indicated, filter unit 13, filter unit supporting brackets 28, frame members 12, rings 14, 15, and 16, manifold 18, and intermediate conduit portion 43 all rotate as a unit. The rings, the filter units and the manifold are supported by roller means 27 mounted within tank 11. Rotatable conduit 43 is supported by bearing means 50 secured to end portion 72 of tank 11. The structure for rotating all of these components is shown in detail in FIGS. 1 and 2. Secured around intermediate conduit portion 43 is a collar 58 fixed to one end of an arm 51 having its other end pivotally connected by a pin 52 to a piston rod 53 extending outwardly from the upper end of an inclined hydraulic cylinder 54 having its lower end pivotally connected by a pin 55 to a bracket 58 on a stanchion 56 supported by a cantilevered member 57 connected to base block 25a.

When hydraulic cylinder 54 is actuated to push the piston rod 53 upwardly and to the right, as viewed in FIGURE 2, the arm 51 is pivoted in a counterclockwise sense about the axis of conduit portions 43 and 77 and rings 14, 15, and 16, as viewed in FIGURE 2, thereby causing rotation of filter units 13 in a clockwise sense, as viewed in FIGS. 4 and 5, from the horizontal filtering position shown in FIGURE 4 to the vertical filter cake-dislodging position shown in FIGURE 5. After dislodgment of the filter cake the hydraulic cylinder 54 is actuated to cause a return of the piston rod 53 to the retracted position shown in FIGURE 2. This causes a pivotal movement of arm 51 in a clockwise sense, as viewed in FIGURE 2, in turn causing rotation of the filter units in a counterclockwise sense, as viewed in FIGS. 4 and 5, from the vertical filter cake-dislodging position shown in FIGURE 5 back to the horizontal filtering position shown in FIGURE 4.

When the filter units are in the vertical position shown in FIGURE 5 they are vibrated by structure shown in detail in FIGS. 3, 4, 5, and 8. More specifically, a corresponding end of each filter unit 13, opposite that end of the unit adjacent manifold 18, has secured thereto a lug 60 having a threaded opening 61 therein (FIGURE 8). Lug 60 is secured to filter unit frame channel 31 and frame bar 32 by weldments 73, and 74, respectively. Located adjacent lugs 60 of filter units 13 is an elongated member 64 extending transversely to the filter units 13. Member 64 has a plurality of openings 63 each aligned with a respective threaded opening 61 in a respective lug 60. A bolt 62 extends through the aligned openings 63 and 61 and fixedly secures member 64 to each of the lugs 60. About halfway along member 64 is a trunnion 65 extending outwardly away from filter units 13. Slippingly mounted around trunnion 65 is a collar 66 attached to one end of a rod 67 extending outwardly through a fluid-tight sleeve 78 in the wall of tank 11, said rod having its other end drivingly connected to vibrator 20 resting on a base 68 mounted on the side of tank 11. When the filter units 13 are rotated from the horizontal position shown in FIGURE 4 to the vertical position shown in FIGURE 5, member 64 rotates therewith, trunnion 65 turning freely within collar 66. When the filter units are in the vertical position shown in FIGURE 5, vibrator 20 is actuated causing vibratory movement in an axial direction along rod 67 which in turn imparts vibratory movement in the direction of arrows 74 (FIGURE 5) to filter units 13.

As shown in FIGURE 1, tank 11 has convex end portions 70 and 72 located above base blocks 25 and 25a, respectively. Each end is hingedly mounted to tank 11 by means not shown to permit the ends to be opened for purposes of gaining access to the interior of tank 11, the loose connection of nipples 45 in manifold sockets 40 facilitating the opening of end 72 to which manifold 18 is connected by virtue of the rotatable mounting of conduit portion 43 on bearing means 50 (FIGURE 1). Referring to FIGURE 10, in the bottom of manifold interior portion 42 is an opening 49 for draining off residual filtrate.

The foregoing detailed description has been given for clearness of understanding only, and no unnecessary limitations should be understood therefrom, as modifications will be obvious to those skilled in the art.

We claim:

1. A filter assembly comprising:
   a filter tank; inlet means for introducing a fluid into said tank;
   a plurality of filter units within said tank, each of said units having a substantially flat filtering surface and an opposed non-filtering surface;
   means unitarily mounting said units in spaced substantially parallel relation;
   a plurality of axially spaced rings, each encircling said units and fixed to said mounting means;
   a pair of roller means for each ring, each pair secured to the interior of said tank and engaging the exterior of a respective ring to mount the ring, the filter unit-mounting means, and the filter units for unitary rotation within said tank between a first position in which the filter units are horizontal and a second position in which the filter units are vertical;
   means for receiving a filtrate from said filter units and discharging said filtrate from said tank;
   means for imparting said rotation,
   means for dislodging a cake from the filtering surface of each unit, and means for removing said cake from said tank.

2. A filter assembly as recited in claim 1 wherein said means for dislodging a cake comprise:
   vibrating means connected to said filter units at a corresponding first end of each unit for imparting vibration to all of the units simultaneously.

3. A filter assembly as recited in claim 2 wherein said vibrating means comprise:
   a lug fixed to each filter unit at said first end;
   an elongated member extending transversely to said filter units adjacent said first end;
   means fixedly connecting said member to each of said lugs;
   a trunnion on said member extending away from said filter units and aligned axially with said rings;
   a collar slippingly mounted on said trunnion;
   a rod having an inner end connected to said collar and extending outwardly through the wall of said tank;
   and means connected to the outside end of said rod for imparting vibration thereto in an axial direction.

4. A filter assembly as recited in claim 1 wherein said means for receiving a filtrate comprise:
   filtrate-receiving manifold means inside said tank and adjacent a second end of each unit;
   means connecting said manifold means with the interior of each filter unit;
   and means mounting said manifold means for rotation with said filter units.

5. A filter assembly as recited in claim 4 wherein said connecting means comprises:
   a nipple on each filter unit at said second end thereof and in communication with said filter unit interior;
   a plurality of protruding sockets fixed on said manifold means, each for connectively receiving a respective one of said nipples and each in communication with the interior of said manifold means;
   each nipple having exterior dimensions which provide a loose fit inside its corresponding socket;
   and a flexible sealing ring around the exterior of each nipple to provide a fluid-tight connection.

6. A filter assembly as recited in claim 1 wherein at least one of said rings has a U-shaped cross-section facing outwardly to receive said roller means.

7. A filter assembly comprising:
   a filter tank;
   a plurality of filter units within said tank, each of said units have a substantially flat filtering surface and an opposed non-filtering surface;
   means unitarily mounting said units in spaced substantially parallel relation;
   a plurality of axially spaced rings, each encircling said units and fixed to said mounting means;
   a pair of roller means for each ring, each pair secured to the interior of said tank and engaging the exterior of a respective ring to mount the ring, the filter unit-mounting means, and the filter units for unitary rotation within said tank between a first position in which the filter units are horizontal and a second position in which the filter units are vertical;
   means for imparting said rotation;
   vibrating means connected to said filter units at a corresponding first end of each unit;
   filtrate-receiving manifold means inside said tank and adjacent a second end of each unit opposite said first end thereof;
   means connecting said manifold means with the interior of each filter unit;
   and means mounting said manifold means for rotation with said filter units.

8. A filter assembly as recited in claim 7 wherein said manifold-connecting means comprises:
   a nipple on each filter unit at said second end thereof and in communication with said filter unit interior;
   a plurality of protruding sockets on said manifold means, each for receiving a respective one of said nipples and each in communication with the interior of said manifold means;
   each nipple having exterior dimensions which provide a loose fit inside its corresponding socket;
   and a flexible sealing ring around the exterior of each nipple to provide a fluid-tight connection.

9. A filter assembly as recited in claim 7 wherein said manifold means extends diametrically within one of said rings and is fastened thereto.

10. A filter assembly comprising:
    a filter tank;
    a plurality of filter units within said tank, each of said units having a substantially flat filtering surface and an opposed non-filtering surface;
    means mounting said units in spaced substantially parallel relation;
    a plurality of axially spaced rings, each encircling said units and fixed to said mounting means;
    a pair of roller means for each ring, each pair resting on the interior of said tank and engaging the exterior of a respective ring to mount the ring, the filter unit-mounting means, and the filter units for unitary rotation between a first position in which the filter units are horizontal and a second position in which the filter units are vertical;
    means for imparting said rotation;
    vibrating means connected to said filter units at a corresponding first end of each unit, said vibrating means comprising:
       a lug fixed to each filter unit at said first end;
       an elongated member extending transversely to said filter units adjacent said first end;

means fixedly connecting said member to each of said lugs;

a trunnion on said member extending away from said filter units and aligned axially with said rings;

a collar slippingly mounted on said trunnion;

a rod having an inner end connected to said collar and extending outwardly through the wall of said tank;

and means connected to the outside end of said rod for imparting vibration thereto in an axial direction;

filtrate-receiving manifold means inside said tank and adjacent a second end of each unit opposite said first end thereof;

means connecting said manifold means with the interior of each filter unit;

and means mounting said manifold means for rotation with said filter units.

References Cited by the Examiner

UNITED STATES PATENTS

| | | | |
|---|---|---|---|
| 1,343,182 | 6/20 | Sweetland | 210—236 |
| 1,858,160 | 5/32 | Leek | 210—328 |
| 2,399,887 | 5/46 | Olson | 210—330 X |
| 2,480,320 | 8/49 | Carrier | 210—388 |
| 2,687,806 | 8/54 | Becker | 210—328 |
| 2,853,193 | 9/58 | Crumb | 210—328 |
| 2,979,204 | 4/61 | Yeiser | 210—236 X |

REUBEN FRIEDMAN, *Primary Examiner.*

GEORGE D. MITCHELL, HERBERT L. MARTIN, *Examiners.*

UNITED STATES PATENT OFFICE
CERTIFICATE OF CORRECTION

Patent No. 3,195,729                                              July 20, 1965

Aloysius C. Kracklauer et al.

It is hereby certified that error appears in the above numbered patent requiring correction and that the said Letters Patent should read as corrected below.

In the grant, lines 2 and 3, for "assignors, by mesne assignments, to C. I. T. Corporation, of Houston, Texas, a corporation of New York," read -- assignors to Sparkler Mfg. Co., of Conroe, Texas, a corporation of Illinois, --; line 12, for "C. I. T. Corporation, its successors" read -- Sparkler Mfg. Co., its successors --; in the heading to the printed specification, lines 5 and 6, for "assignors, by mesne assignments, to C. I. T. Corporation, Houston, Tex., a corporation of New York" read -- assignors to Sparkler Mfg. Co., Conroe, Tex., a corporation of Illinois --.

Signed and sealed this 30th day of November 1965.

(SEAL)
Attest:

ERNEST W. SWIDER                                EDWARD J. BRENNER
Attesting Officer                               Commissioner of Patents